(12) United States Patent
Nixon et al.

(10) Patent No.: US 7,289,994 B2
(45) Date of Patent: Oct. 30, 2007

(54) INTERCONNECTED ZONES WITHIN A PROCESS CONTROL SYSTEM

(75) Inventors: Mark J. Nixon, Round Rock, TX (US); Robert Havekost, Austin, TX (US); Ken Beoughter, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 255 days.

(21) Appl. No.: 10/119,269

(22) Filed: Apr. 9, 2002

(65) Prior Publication Data

US 2002/0111948 A1  Aug. 15, 2002

Related U.S. Application Data (63) Continuation-in-part of application No. 09/560,361, filed on Apr. 28, 2000, now Pat. No. 6,704,737.

(60) Provisional application No. 60/160,104, filed on Oct. 18, 1999.

(51) Int. Cl.
*G06F 7/00* (2006.01)
*G06F 17/30* (2006.01)
*G05B 15/00* (2006.01)

(52) U.S. Cl. ................. 707/10; 700/1; 700/9

(58) Field of Classification Search ............ 707/2, 707/9, 103 R; 709/249, 225, 250; 713/201
See application file for complete search history.

(56) References Cited

U.S. PATENT DOCUMENTS

| | | | |
|---|---|---|---|
| 4,007,450 A | 2/1977 | Haibt et al. | |
| 4,888,726 A | 12/1989 | Struger et al. | |
| 5,560,005 A | 9/1996 | Hoover et al. | |
| 5,724,575 A | 3/1998 | Hoover et al. | |
| 5,828,851 A | 10/1998 | Nixon et al. | |
| 5,838,563 A | 11/1998 | Dove et al. | |
| 5,845,230 A * | 12/1998 | Lamberson | .......... 702/56 |
| 5,956,483 A * | 9/1999 | Grate et al. | .......... 709/203 |
| 6,000,045 A * | 12/1999 | Lewis | .......... 714/47 |
| 6,131,120 A * | 10/2000 | Reid | .......... 709/225 |
| 6,263,487 B1 * | 7/2001 | Stripf et al. | .......... 717/171 |

(Continued)

FOREIGN PATENT DOCUMENTS

| | | |
|---|---|---|
| GB | 2 363 871 A1 | 1/2002 |
| GB | 2 363 872 | 1/2002 |
| WO | WO97/26587 | 7/1997 |

OTHER PUBLICATIONS

Define: firewall Dec. 19, 2005 http://www.google.com 1-3.*

(Continued)

*Primary Examiner*—Sam Rimell
*Assistant Examiner*—Jacob F. Betit
(74) *Attorney, Agent, or Firm*—Marshall, Gerstein & Borun LLP (57) ABSTRACT

A process control system includes multiple zones containing process control network communicatively interconnected to exchange information necessary to monitor the system and to perform process control. Each zone may include an inter-zone server that controls the exchange of information between the zones via communication links. In addition to controlling the routing of information between the zones, the inter-zone servers may perform additional processing on the information being exchanged, such as security monitoring, language translation and version control.

46 Claims, 2 Drawing Sheets

U.S. PATENT DOCUMENTS 6,701,437 B1 * 3/2004 Hoke et al. .................. 713/201
6,799,077 B1 * 9/2004 Hauet ............................ 700/2

OTHER PUBLICATIONS

Firewall—a Whatis.com definition Dec. 19, 2005 http:searchnetworking.techtarget.com 1-2.*
What is a firewall?—A Word Definition From the Webopedia Computer Dictionary Dec. 19, 2005 http://www.webopedia.com 1-3.*
Firewall (networking)—Wikipedia, the free encyclopedia Dec. 19, 2005 http://en.wikipedia.org 1-4.*
Examination Report issued by the U.K. Patent Office for Application No. GB0308043.9 dated Jan. 28, 2005.

* cited by examiner

INTERCONNECTED ZONES WITHIN A PROCESS CONTROL SYSTEM

RELATED APPLICATIONS

This is a continuation-in-part of U.S. application Ser. No. 09/560,361, filed Apr. 28, 2000 now U.S. Pat. No. 6,704,737, which is a regular filed application based on Provisional Application Ser. No. 60/160,104 filed Oct. 18, 1999 entitled "Accessing and Updating a Configuration Database From Distributed Physical Locations Within a Process Control System," both of which are hereby expressly incorporated by reference herein.

FIELD OF THE INVENTION

The present invention relates generally to process control systems and, more particularly, to a process control network made up of plurality of communicatively interconnected process control networks that can exchange data.

DESCRIPTION OF THE RELATED ART

Process control systems, like those used in chemical, petroleum or other processes, typically include at least one process controller communicatively coupled to at least one host device or operator workstation and to one or more field devices via analog and/or digital buses or other communication lines or channels. The field devices, which may be, for example, valves, valve positioners, switches, transmitters (e.g., temperature, pressure and flow rate sensors), etc. perform functions within the process such as opening or closing valves and measuring process parameters. During runtime of a process, the process controller receives signals indicative of process measurements made by the field devices and/or other information pertaining to the field devices via an input/output (I/O) device, uses this information to implement a control routine and then generates control signals which are sent over the buses or other communication channels via the input/output device to the field devices to control the operation of the process. Information from the field devices and the controller is typically made available during runtime to one or more applications executed by the operator workstation to enable an operator to perform any desired function with respect to the process, such as viewing the current state of the process. Additionally, configuration applications executed on a user interface, such as a host device, workstation, laptop computer, etc. may be used to modify the operation of the process, configure the process, view the configuration of the process, document the process configuration, etc.

In the past, some of the process control system user interfaces, configuration databases and controllers were communicatively connected together by a dedicated bus, such as an Ethernet bus, to form a local area network (LAN). Because the dedicated Ethernet bus has a large bandwidth, and because any particular signal or data request sent over the Ethernet bus does not have to travel over a very long distance within the LAN, communication between the user interfaces, controllers and devices is fairly straightforward and fast in these systems. As a result, configuration display routines executed in the user interfaces, for example, typically access and retrieve configuration information from the configuration database each time the user indicates or requests information pertaining to the configuration of the process control system. This retrieved information is then sent out over the Ethernet bus and is displayed to the user at the user interface. Because each process control network is essentially its own self-contained environment, information within the process control networks is homogeneous and access thereto is relatively straight forward. With some exceptions, the user interfaces, controllers, devices, etc. operate under the same version of process control network software and exchange information in the same format and using the same language. Because messages transmitted in the process control network remain in the network, each node in the process control network can be assigned a unique name for routing messages between the nodes. Moreover, the process control networks have existing security processes in place for granting or denying access to information within the process control networks. Still further, consistent strategies for handling alarms, events, performance information and the like are typically implemented throughout the process control network.

Recently, however, there has been a general increase in the size of some process control systems and there has been a desire to integrate information for process control networks spread out or distributed over larger or separated geographical areas. For example, some users wish combine the configuration data associated with different process sites, which may be in different counties, states or even different countries, thereby allowing an operator at a first site to access and view configuration information about a second site and possibly even perform configuration activities that effect the second site from the first site. In another example, a user may wish to integrate an oil well located on a platform many miles out in the ocean with an oil refinery process control system having numerous controllers, user interfaces, etc. located on the mainland. In this case, it is desirable to enable a user at the oil refinery site to reconfigure or effect the configuration of the devices on the oil well platform without actually having to fly out to the platform, connect a user interface to a terminal on the oil well platform and reconfigure the oil well controller, as is typically necessary now. Still further, with the integration of multiple process control sites, the number of user interfaces which may be used to simultaneously access the configuration databases of these sites increases significantly.

This integration requires the exchange of information in addition to the exchange and maintenance of configuration data. While the process control networks may be geographically separated, it may be desirable or required to share information either at run time or cumulatively. For example, the process control networks may relate to upstream and downstream processes where the output of one process is used as the input to the other process. In such processes, an alarm or state change in one process may affect process control and configuration in the other. It may also be desirable to have a central controller or operator with the watch and manage both processes. The process control networks may involve parallel processes that are required to maintain parallel operations. For such processes, a change in processing, control or monitoring of one of the parallel process may require a corresponding change in the other process, to either mirror the change to the first process or to compensate for the first process.

In addition to geographic separation, situations exist where two or more process control networks operate in the same geographic location, and it is desirable or required for those networks to share information. For example, in large systems, it may be desirable to distribute configuration responsibilities to multiple autonomous users and/or to configure data on distributed workstations. As another example, it may be desired for a particular process to have one process control network that performs process control, and a second process control network that performs regulatory functions for the process. This arrangement may be particularly desirable where the data stored for regulatory purposes must remain sacrosanct and access by the majority of users must be denied. Moreover, the process control networks may be upgraded separately to implement a new release of process control software without upgrading to software regulatory process control network, and thereby avoiding recertification of the regulatory network, which can be expensive and time consuming. Other applications where two or more communicatively linked process control networks may be necessary or desirable include situations where the process control networks were acquired, commissioned or certified at different times, and where the process control networks are associated with different profit centers.

Connecting two or more process control networks into a process control system can result in additional integration issues beyond just moving data between the systems. While node or device names are typically unique within a process control network, the same name may be used simultaneously within two or more process control networks within the process control system, which may cause ambiguity where, for example, a message transmitted in the process control network containing a device name to which the message is directed without specifying the process control network within which the particular device resides. The various process control networks may operate under different software versions, use characters and data in different languages, or handle alarms or events differently, but they must be able to interpret messages passing between the process control networks in order for the process control networks to function inter-dependently. Moreover, security must be maintained between the process control networks to ensure that information passing between the process control networks, and users passing the information, are authorized to do so.

For these and other reasons, in order to implement the connection and exchange of information between process control networks, there is a need to communicatively link together two or more process control networks to facilitate this exchange of information.

SUMMARY OF THE INVENTION

A process control system is composed of a plurality of communicatively interconnected zones, each zone having a process control network, with the zones exchanging information necessary to monitor the system and to perform process control. Each zone includes an inter-zone server connected to one or more inter-zone servers of other remote zones by communication links to facilitate the exchange of messages in order to monitor and/or control the interconnected process control networks. In addition to controlling the routing of information between the zones, the inter-zone servers may perform additional processing on the information being exchanged, such as security monitoring, language translation and version control.

According to one aspect of the present invention, a process control system includes a plurality of process control networks, each having inter-zone servers communicatively coupled to one or more of the other inter-zone servers via communication links. The process control system further includes a communication routine that uses the communication links to transfer process control messages between the process control networks. The inter-zone server of the local zone transfers messages to the inter-zone servers of the remote zones to which it has a direct connection via a communication link, and also may redirect messages received from one remote zone to another remote zone to which the first remote zone is not directly connected. The inter-zone servers may use information contained in the process control messages transmitted by devices in the local zone to determine the remote zone and remote device to which the process control message is directed. The inter-zone server may use other information in the process control messages either sent by or received into the local zone to confirm that the zone, user or device has authority to send or receive the process control message, or that the level of access sought by the message is authorized, to convert or reformat the process control message to conform to different versions of software under which the local and remote zones may operate, to convert or reformat alarm messages to cause an anticipated notification or alarm in a local or remote zone, to translate the language of a process control message, and the like.

DESCRIPTION OF THE PREFERRED EMBODIMENTS

Figure 1:
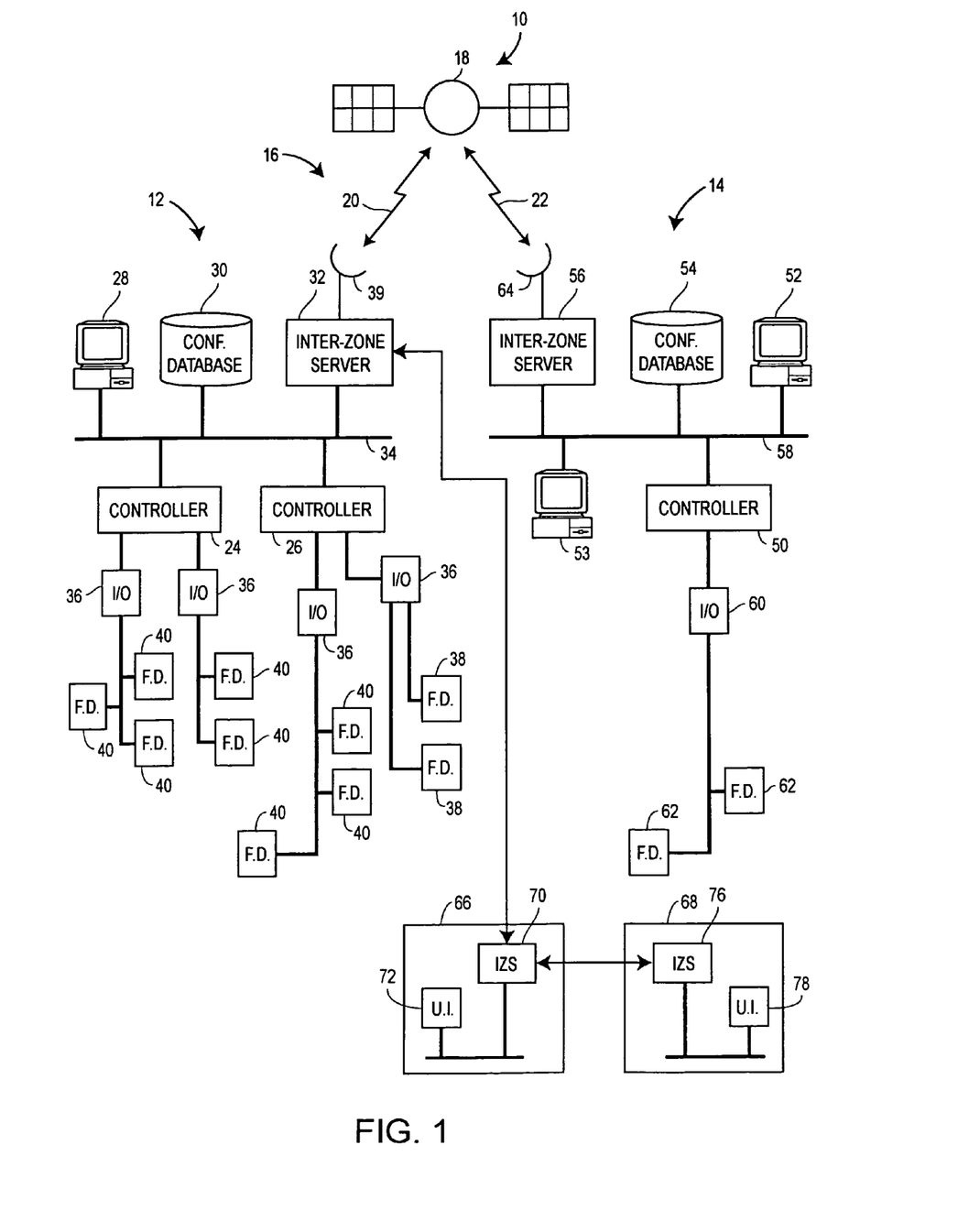
FIG. 1 is a block diagram of a process control system having multiple zones communicatively connected via communication links.

Referring now to FIG. 1, a process control system 10 includes geographically separated zones or locations 12 and 14 communicatively connected via a satellite communication link 16 formed by a satellite 18 having a first uplink/downlink channel 20 and a second uplink/downlink channel 22 which may be two way channels. The first zone 12, which will be referred to herein as the local or main zone 12, has a process control network including two process controllers 24 and 26 connected to a user interface 28, a configuration database 30 and an inter-zone server 32 via a dedicated local area network bus 34 which may be, for example an Ethernet or any other desired bus or communication line. The user interface 28 may be any desired type of host workstation or computer, such as any type of personal computer, laptop computer, etc. while the configuration database 30 may be a stand-alone database device or may be integrated into any other device, such as the user interface 28 or the inter-zone server 32. The inter-zone server 32 includes an antenna 39 which the inter-zone server 32 uses to communicate over the slow or low bandwidth communication link 16 to the second process control zone 14, which will be referred to herein as the remote zone 14.

Each of the controllers 24 and 26 is connected to one or more input/output (I/O) devices 36 which, in turn are connected to field devices which may be any desired type of field devices, such as conventional 4–20 milliamp devices 38 or any smart field devices 40 like HART®, PROFIBUS®, Actuator Sensor Interface (AS-Interface), WORLDFIP®, Device-Net®, CAN, FOUNDATION™ Fieldbus (hereinafter "Fieldbus") etc., devices. Of course, the devices 38 and 40 may be any desired types of devices such as sensors, transmitters, valves, fans, mixers, positioners, etc. which may perform any control, measurement or other function within the process control system 10. The controllers 24 and 26 may communicate with the field devices 38 and 40 using any known or desired type of I/O devices 36 and communication protocols such as the protocols associated with any of the above-identified types of devices. Generally speaking, the controllers 24 and 26, which may be, by way of example only, DeltaV™ controllers sold by Fisher-Rosemount Systems, Inc., each include a processor and a memory for storing data, programs, and control routines (such as process control modules) used to implement control of the process 10 at the local zone 12. Generally speaking, the controllers 24 and 26 receive signals from the field devices 38 and 40, execute process control routines and provide control signals to the devices 38 and 40 to thereby implement control of the process 10.

Similarly, the remote zone 14, has a process control network including a process controller 50 connected to user interfaces 52 and 53, a configuration database 54 and an inter-zone server 56 via a dedicated local area network bus 58 which may be, for example an Ethernet or any other desired bus or communication line. The controller 50 is illustrated as being connected through an I/O device 60 to two smart field devices 62 but could be connected to any other numbers or types of field devices. The data server 56 uses an antenna 64 to communicate via the slow or low bandwidth link 16 to the data server 32 to thereby effect communications between the local zone 12 and the remote zone 14. The devices within the remote zone 14 may be the same as or similar to the corresponding devices within the local zone 12 and perform process control and reporting operations at the remote zone 14. Likewise, it will be understood that other devices or other numbers of devices could be connected within either or both of the zones 12 and 14 to perform process control and configuration activities in any desired manner. In fact, one of the zones, such as the remote zone 14, could be a single device, like a user interface, if so desired.

As will be understood, the inter-zone servers 32 and 56 operate to provide a communication connection between the two buses 34 and 58 to thereby enable communication between the devices within the local zone 12 and the remote zone 14. While the communication link 16 is illustrated as a satellite link, any other communication link could be used instead, including for example, a cellular link, a modem or telephone line link, an Internet link or any other wireless or wide area or shared local area network link. Of course, any desired communication strategy may be employed within the communication link 16 to provide communication of data via the link 16. Thus, any communication protocol, such as the IP or TCP or UDP protocols may be used and any modulation techniques, error encoding techniques, etc. may be used to implement communication via the link 16 including, for example, spread spectrum techniques. Preferably, some sort of data acknowledgment scheme is used in the communication link 16 to assure secure and reliable communications in the presence of noise or other interference. If desired, the data acknowledgment scheme or technique described in U.S. patent application Ser. No. 09/418,747, entitled "Deferred Acknowledgment Communications and Alarm Management" which was filed on Oct. 15, 1999, which is assigned to the assignee of the present invention and which is hereby expressly incorporated by reference herein, may be used to effect communications through the communication link 16. Generally speaking, the use of the communication link 16 enables geographically separated process control sites or systems to be integrated together to form a single process control system wherein the devices within one zone can communicate with the devices at the other zone to perform control and configuration activities.

In addition to geographically separate zones 12 and 14, the process control system 10 may further include additional zones 66 and 68 which are located geographically proximate to local zone 12, perhaps within the same complex or building. The zones 66 and 68 each include their own process control network related to the networks of zones 12 and 14 whereby it is desirable or required to exchange information between the zones. Zone 66 includes an inter-zone server 70 and a user interface 72, with the inter-zone server 70 being connected to the inter-zone server 32 of the local zone 12 via a communication link 74. The communication link 74 may be an Ethernet bus, a leased line, a virtual private network over TCP/IP, or any other type of dedicated or intermittent communication connection. Of course, it is likely preferred to the communication link 74 be a dedicated connection if, for example, runtime process control data passes between zones 12 and 66 to effect process control in one or both zones 12 and 66.

Zone 68 includes an inter-zone server 76 and a user interface 78, with the inter-zone server 78 being connected to the inter-zone server 70 of zone 66 via a communication link 80. The communication link 80 may be of a similar type to the communication link 74 between inter-zone servers 32 and 66, or of a different type as dictated by the requirements of exchanging data between zones 66 and 68. Although zones 66 and 68 are geographically proximate to local zone 12, they will be referred to herein as remote zones 66 and 68 for clarity in discussing communications between the local zone 12 and the other zones of the process control system 10.

While the remote zones 66 and 68 as illustrated show only the inter-zone servers 70 and 76, respectively, and user interfaces 72 and 78, respectively, the remote zones 66 and 68 may contain any combination of user interfaces, operator workstations, controllers, I/O devices and field devices necessary to implement the process control networks of remote zones 66 and 68. Conversely, one or both of the remote zones 66 and 68 may consist of a single user interface or operator workstation functioning as both the inter-zone server and the user interface for the zone. The process control system 10 may have, as just one example, upstream and downstream processes at zones 12 and 14, respectively, exchanging process control information to facilitate processing the output of the upstream process at the facility of the downstream process. At the same time, zone 66 includes a process control network gathering regulatory data from the upstream process occurring in local zone 12. Additionally, remote zone 68 may be the operations center for the process control system 10 and include one or more operator workstations at which operators monitor the performance of the process control system 10 and implement changes to the system which disseminated to the zones 12, 14 and 66 via the communication links 16, 74 and 80.

As stated, the preceding is merely one example of a system of interconnected zones implemented via the method and apparatus of the present invention. While remote zone 68 is shown as having a direct connection to only remote zone 66, the remote zone 68 may have addition communication links directly from inter-zone server 76 to inter-zone servers 32 and 56 of zones 12 and 14, respectively, and be of a type dictated by geographic distance, data exchange requirements and other factors. Moreover, the process control system 10 may include one or more additional zones connected by communication links in order to implement the full process control strategy of the enterprise implementing the process control system 10.

The connections and exchange of data between the zones 12, 14, 66 and 68 are implemented via the inter-zone servers 32, 56, 70 and 76, respectively. The inter-zone servers 32, 56, 70 and 76 control the flow of information into and out of their respective zones, and may perform operations on the exchanged data in order to facilitate the use of the information by the inter-connected process control networks. Using the inter-zone server 32 of local zone 12 for reference, outbound messages from the components of the process control network of local zone 12 to components of the remote zones are transmitted on the bus 34 and detected by the inter-zone server 32. Each message contain information indicating to the inter-zone server 32 that the message is intended for a remote zone, and allowing the inter-zone server 32 to determine to which remote zone to direct the message. Depending on the configuration of the process control system 10, the inter-zone server 32 may be configured to perform processing on the information in the message before transmitting the message to the designated remote zone or zones, such as performing a security check to ensure that the type of access being sought in the message (read access, read/write access) is authorized for the local zone 12 or the user transmitting the message, translating the message into a language that is used in the remote zone, converting the message to an older or newer software version, and the like.

Once the remote zone or zones are identified and any necessary processing is performed on the message, the inter-zone server 32 transmits the message to the remote zone or zones on the appropriate communication link 16 or 74. Messages for components of the process control network of remote zone 14 are transmitted over the slow communication link 16 to the inter-zone server 56. Messages for components in remote zone 66, such as the user interface 72, are transmitted over the communication link 74 to the inter-zone server 70. Although local zone 12 does not have a direct communication link to remote zone 68, messages for components of remote zone 68 are transmitted over communication link 74 to remote zone 66 which, in turn, will transmit the messages on to inter-zone server 76. The routing of the messages may be implemented within the inter-zone servers or, depending on the configuration of the process control networks and process control system, in other components handling the communications between the zones. While the zones 12, 14, 66 and 68 of FIG. 1 are illustrated as being interconnected linearly such that only a single communication path exists between each pair of zones, it will be understood that more complex configurations of multiple zones in a process control system may be implemented using the method and apparatus of the present invention whereby more than one communication path may be available between a given pair of zones. In these more complex systems, message routing strategies may be implemented with predetermined routes or with the capability to determine an optimal route through which to direct messages exchanged between zones that do not have direct communications links.

The inter-zone server 32 also receives the inbound messages from remote zones 14, 66 and 68 transmitted over the communication links 16 and 74, respectively. As with the outbound messages, the inter-zone server 32 may be configured to perform processing on the information in the inbound messages, such as performing security checks, translation, version control, and the like as discussed above. The inbound messages contain information identifying the component or components of the local zone 12 to which the inbound message is directed. After performing any necessary processing of the inbound message, the inter-zone server transmits the inbound message to the component or components of the local zone 12 over the bus 34.

Figure 2:
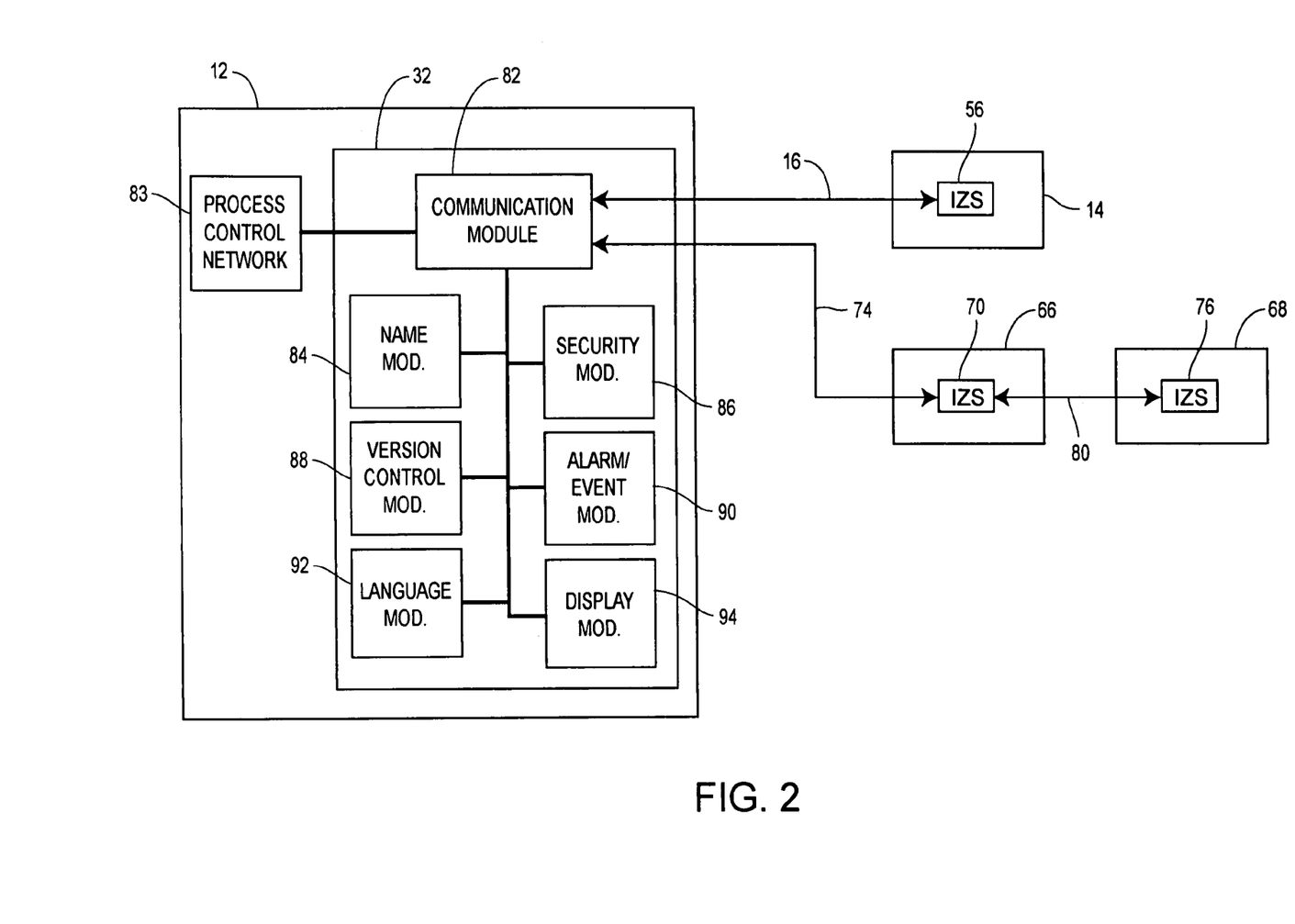
FIG. 2 is a block diagram of an inter-zone server communicatively interconnecting the process control network of a local zone to a plurality of remote zones.

Referring to FIG. 2, wherein the same reference numerals are used for reference to the same components identified in FIG. 1, the inter-zone server 32 is exemplary of one alternative configuration of an inter-zone server according to the present invention. As discussed above, the other nodes or devices of local zone 12 rely on the inter-zone server 32 for communications with nodes and devices of the remote zones 14, 66 and 68. The inter-zone server 32 includes a communication module 82 that controls the flow of messages through the inter-zone server 32 and, consequently, into and out of the local zone 12. The communication module 82 transmits messages to and receives messages from the components of the process control network 83 of local zone 12 via the bus 34. The communication module 82 is also connected to similar communication modules in the inter-zone servers 56 and 70 of remote zones 14 and 66, respectively, via the communication links 16 and 74, respectively.

In order for the communication module 82 to route outgoing messages to the correct node in the correct remote zones, the communication module 82 must have access to reference or path information identifying the remote zones and/or nodes. The reference information may take the form of, for example, "//ZoneName/NodeName/ . . . ," or any other desired form. It will be understood that zone names must be unique within the process control system 10 to resolve any inter-zone references without conflict. Within each zone, there is a name space for nodes and the configuration system may enforce uniqueness tags within a zone. Thus, a given combination of a zone name and node name should be unique within the process control system 10. Of course, it will be further understood that, especially in systems where control and configuration operations are centralized, a naming strategy may be implemented wherein every node, regardless of the zone in which it is located, has a unique name such that no inter-zone naming conflicts arise.

To route a message to the appropriate device in a remote zone, the message must contain the unique information necessary to route the message. For example, at the time a device is configured to transmit messages to devices in remote zones, the remote zone name and device name may be stored at the device so that the device in the local zone 12 can include the entire path for routing the message to the device in the remote zone. Upon receiving the message at the inter-zone server 32, the communication module 82 uses the path information in the message to route the message to the device in the appropriate remote zone 14, 66 or 68. Even if the local device does not typically store the entire path for a remote device, the device may be able to supply the entire path to the communication module 82 when the local device is transmitting a message in response to a request from a device in a remote zone if the original request message contained the path information for the requesting remote device.

Alternatively, the inter-zone server 32 may include a name module 84 that stores path information for the remote devices with which the devices of the local zone 12 are configured and/or authorized to communicate. The message from the local device may contain information identifying the remote device to which the message is directed. Upon receiving the message, the communication module 82 accesses the name module 84 to retrieve the path information for the remote device, and routes the message to the appropriate remote zone 14, 66 or 68 based on the information retrieved by the name module 84. The information provided by the name module 84 may be stored, for example, in the configuration database 30 of the local zone 12. Alternatively, the name module 84 may access a separate database that stores only information relating to inter-zone communications. Such a database may be populated with routing information as part of the configuration process at the time a device is configured to transmit messages to a device in a remote zone. As a further alternative, at the time new zones are added to the process control system 10, the name module 84 may issue a request via the communication module 82 to the new remote zone for information identifying the devices present in the remote zone. The request may be directed to the configuration database of the remote zone, or may be an unsolicited broadcast message requesting the devices in the remote zone to respond and identify their presence.

In process control systems implementing a global naming strategy wherein each device in the system has a unique name, the name module 84 should only find a single path corresponding to a device name. However, in installation where a global naming strategy is not implemented, the name module 84 may retrieve multiple paths for a given device name corresponding to each zone, whether local or remote, in which the device name is used. The ambiguous device names may be resolved based on the configuration of the system and requirements of the process. For example, the system may implement a naming strategy wherein devices performing the same function in different zones, and consequently different name spaces, are given the same device name so that a single message may be transmitted to all the devices simultaneously. In such a strategy, the communication module 82 transmits the message to each remote zone for which the name module 84 retrieves a path. If no such strategy is implemented and duplicate device names occur by happenstance, other conflicting device name resolution strategies may be implemented. For example, the communication module 82 may ignore the message if the device name is used in the local zone 12 because the local device will detect the message on the bus 34. If the device name is not found in the local zone 12, the communication module 82 may route the message based on a predetermined hierarchy of remote zones 14, 66 and 68, or may issue an alarm message or other message to an operator workstation or user interface of the local zone 12 giving notice to the users of an resolvable naming conflict.

In some process control systems, it will be necessary to implement security measures to limit inter-zone access and inter-zone operations. Security procedures will typically exist within the process control network of each individual zone 12, 14, 66 and 68, with such security controlling access to and updates of information within the zones. An extension of the intra-zone security to inter-zone communications may be implemented by a security module 86 at the inter-zone server 32. The security module 86 stores information regarding individual users or groups of users with authority for sending and receiving messages to and from the local zone 12. Upon receiving a message at the inter-zone server 32, which may include both inbound messages from remote zones 14, 66 and 68 and outbound messages from devices in the local zone 12, the communication module 82 accesses the security module 86 with identification information for the user obtained from the message. The security module 86 determines whether the user is authorized to access the target zone and may also determine whether the type of access sought is a type for which the user is authorized (e.g., read only authority, read/write authority, and the like). Authorized messages are transmitted by the communication module 82, while unauthorized messages are denied access, and the security module may cause the communication module to transmit notifications or alarm messages to the user sending the message, to the system administration of the local and/or remote zone, or to other locations, users or devices as dictated by the requirements of the process control system 10.

The system administrator of the local zone 12 controls the security privileges granted to users in the remote zones 14, 66 and 68. Within the zone, the system administrator controls which plant areas of the process control network 83 are accessible from the remote zones 14, 66 and 68, and the type of access allowed for the authorized users. The authority granted by the system administrator is determined by the security policies of the process control system 10. At the highest level, access to the local zone 12 may be denied for users from a particular remote zone, such as zone 68 for example. In this case, the security module 86 will reject any message from a user in remote zone 68 regardless of the type of access requested. This type of security strategy may be necessary if the communication link between the zones is not secure or reliable, or if the remote zone has been corrupted and the integrity of its data is not guaranteed.

In other implementations, the local zone 12 may rely on the security configuration of the remote zone to evaluate the authorization of the messages. The security module 86 of the local zone 12 may be configured to permit access to all messages from the remote zone. Where zone-level security is authorized, it may be useful to setup a proxy user in the security module of the remote zone to represent all the users in the remote zone, thereby avoiding the need to set up a security profile in the local zone 12 for each user in the authorized remote zone. Full zone authorization may be particularly advantageous where the local zone is operated by the operator of the remote zone.

At the lowest level, individual users from remote zones are granted rights to specific types of access in the local zone 12. In such a case, the security module 86 evaluates each inbound message from the user to insure the message pertains to a type of access for which the remote user is authorized in the local zone 12. As previously discussed, authorized messages are transmitted by the communication module 82, while notifications and/or alarm messages are issued for unauthorized messages.

Situations may also arise wherein a user authorized in and typically working in the local zone 12 is working at the remote zone 14 without direct access to the process control network of the local zone 12. For example, the user may have traveled to the remote zone 14 in order to perform maintenance on one of the field devices 62, and may require information, such as configuration data for the particular field device 62, that is stored at the local zone 12. In order to gain access to the information in the process control network of the local zone 12, the user may be permitted by the operator overseeing the process control network of remote zone 14 to utilize various applications running on the process control network of remote zone 14. To allow the user to transmit messages to the process control network in the local zone 12, the applications in the remote zone 14 may allow the user to input user identification information and authentication information to messages he/she transmits from the remote zone 14 to the local zone 12. Upon receipt at the inter-zone server 32, the security module 86 compares the security information for the user in the message to security information for the identified user at the local zone 12 to determine whether the user is authorized for the level of access sought by the message. In the user and the message are authorized, the communication module 82 transmits the message on the bus 34 of the process control network 83. Access by the user from the local zone 12 to the process control network in the remote zone 14 may be provided through the user identification of a person with whom the user is working, a common user identification set up in the remote zone 14 for use by users from other zones, a temporary user identification set up with limited authorization in remote zone 14, or any other strategy whereby users from other zones may be granted limited access for the purpose of transmitting messages to a zone for which the user is authorized for access.

As previously discussed, multiple zones may be interconnected when it is desirable to perform software upgrades or downgrades in one zone constituting a portion of the process control system 10 without changing the software in other parts of the system, such as in a zone in which the regulatory process control network resides. In instances where the local zone and remote zone operate under different software versions, it may be necessary to convert messages transmitted between the zones in order to maintain inter-operability between the versions of process control network software. For this reason, the inter-zone server 32 may further include a version control module 88 programmed to identify messages between zones having incompatible software versions, and to perform any necessary message conversion so that the message may be processed by the receiving device.

In some implementations, it may be advantageous to have the version control module 88 of the inter-zone server operating under the later version of software manage any necessary message conversion. For example, local zone 12 may operate under a later software version than remote zone 14. When the communication module 82 receives a message from a device in local zone 12 directed to a device in remote zone 14, the communication module 82 accesses the version control module 88 to determine whether the message requires conversion to the proper format for the older software version under which remote zone 14 operates. If necessary, the version control module 88 converts the message and the communication module 82 transmits the converted message to remote zone 14. Upon receiving a message from remote zone 14 for a device in local zone 12, the communication module 88 determines whether the message must be converted for use by the device in the local zone 12. Depending on the software, the devices in local zone 12 may be downward compatible with the older software version, thereby being capable of receiving the messages from remote zone 14 without conversion by the version control module 88. If the software is not downward compatible with the older version, the version control module 88 performs the necessary conversion and the communication module 82 transmits the converted message to the device in the local zone 12 via the bus 34. It will be understood that some or all of the version control functionality may be implemented at the version control module 88 of the remote zone 14 operating under the older software version by upgrading that version control module 88 without upgrading the software for the functional portions of the process control network of the remote zone 14.

In implementations of interconnected zones according to the method and apparatus of the present invention, it may be desirable to pass alarm and event messages between the zones. For example, the operators or process control network of local zone 12 may be able deal with alarms emanating from remote zones 14, 66 and 68. Moreover, alarms and events occurring in remote zones 14, 66 and 68 may require a response within local zone 12, either automatically by the process control networks or manually by the operators. However, the same type of alarm may provoke a different response in different zones. For this reason, an alarm or event message from a remote zone should provoke the appropriate response in the local zone 12, such as displaying priority words, sounding horns, and displaying alarm banners, that should be provoked under the alarm priority configuration by a similar type of alarm or event message occurring within the local zone 12.

In order to transfer alarm and event messages, devices in the remote zone are configured to transmit the messages to devices in the local zone 12 in the manner previously discussed. Alarm or event messages from the devices in the remote zone are transferred between the remote zone and local zone 12 via their respective inter-zone servers to the local zone device, which may be, for example, an operator workstation or other user interface. One alternative for causing the alarm or event message from the remote zone to provoke the recognized response in the local zone is to implement a uniform alarm or event priority strategy whereby all the zones assign the same code to similar alarm types or events occurring in the process control system 10. The coding strategy may be, for example, a numeric priority level code that is used throughout the process control system 10. Using the consistent coding system, each zone may have a unique alarm priority configuration for the display and notification of alarms and events. When the alarm or event occurs in the remote zone, the alarm or event message contains the standard code for the type of alarm or event that is occurring. When the message is received by the device in the local zone, the standard alarm or event code cause the device to respond according to the alarm priority configuration of the local zone 12.

The inter-zone alarm or event messages may also be handled by an alarm/event module 90 of the inter-zone server 32. The alarm/event module 90 may implement the alarm priority configuration for the local zone 12, and cause the appropriate response to occur in the local zone based on the alarm priority codes in the message. Alternatively, each zone may have a unique alarm priority configuration with unique alarm and event messages, with the alarm/event module 90 at each zone storing an alarm and event message cross-reference or conversion table containing information for converting alarm and event messages from remote zones into alarm and event messages conforming to the alarm priority configuration of the local zone.

Still further, if desired, different zones may use different languages which may be beneficial in, for example, Europe, where companies span regions using many different languages. In this case, enumerated values may be passed between zones as numeric values or as a local data string (such as a word) which may be displayed along with a numeric value that is common throughout the process control system for the same word or phrase in different languages. In this manner, a user may identify the enumerated value, command, etc. by its corresponding number, which enables ease of conversion from one language to another. In any event, to browse a database that uses a different language requires that the relevant font be installed on the browsing machine or zone. In one embodiment, inter-zone references are configured in the language of the remote zone and Unicode strings are used throughout the system exclusively to enable detection or conversion of any character in any language supported by Unicode. In this case, the inter-zone server 32 may include a language module 92 having a database that may handle storing strings of multiple languages, with the database export files being exchanged in Unicode format. In other words, files from different locales are imported into each database using the Unicode format.

Process control networks typically include display management capabilities allowing the operators of the network to creat displays for viewing parameters of the process control network at the user interfaces. The displays are created by an operator at a user interface and are stored in a known directory of the file system for retrieval by an operator at a later time. In the process control system consisting of multiple inter-connected process control networks, it may be desirable to make the displays created in one zone available for use by the other zones for displaying parameters and, possibly, for constructing single displays that involve parameters from multiple zones.

In order to construct displays usable by other zones, the user interface 28 in local zone 12 may access a display management routine allowing an operator to create a display for viewing parameters of the process control network of the local zone 12. Once created, the display management routine can store the display in a known directory of the file system of the local zone 12 for future use. If the display is intended to be made available to remote zones with which the local zone 12 communicates, the display management routine can save the display with the zone name or other zone identification information to the path information for the parameters in the display so that messages from remote zones requesting values of the parameters can be routed back to the local zone 12. Once created, the shared displays are transmitted on the bus 34 to the inter-zone server 32 for publication to the remote zones with which the local zone 12 communicates.

When the shared displays are received at the inter-zone server 32, a display module 94 distributes the shared displays to the remote zones with which the local zone 12 communicate. After receiving the shared displays, the display module 94 may utilize the configuration rules in the local zone 12 to determine which remote zones communicate with the local zone 12. Once determined, the display module 94 causes the communication module 82 to transmit the messages to the inter-zone servers of the identified remote zones. The display module 94 may also retain a copy of the shared displays in a database of published displays against which modified displays may be compared to determine and transmit to the remote zones messages indicating changes that have been made to previously published displays. The published display database may also facilitate the re-publication of existing shared displays to remote zones for which communications are established after the initial publication of the displays. Alternatively, the display management routine may be configured to transmit messages with changes to existing shared displays, with the display module 94 forwarding the change messages to the remote zones.

When the published displays are received at the remote zones, the display modules 94 of the inter-zone servers of the remote zones transmit the display messages to devices and applications of the process control network of the remote zone that are configured as subscribing to published displays. The display module 94 may store a list of the subscribing devices and applications or, alternatively, may access the configuration database of the remote zone to identify the subscribing devices and applications. The display module 94 causes the communication module 82 to transmit the published displays on the bus of the process control network to the subscribing devices and applications, which may store the published displays in a directory of the file system along with other local and published displays.

Once stored, the display management routines in the remote zones may retrieve and display the published displays at user interfaces in the remote zones. The display management routine uses the routing information, including the local zone identification information for the zone in which the parameters are located, to format and transmit messages requesting values for the displayed parameters. Moreover, in addition to displaying the published display, the display management routine may also be used to combine the published display with local displays and other published displays into a single display of information of the process control system or of a relevant portion of the process control system. By publishing displays between zones of the process control system, the display configuration effort may be minimized where users want to use displays originally created to view parameters in one zone on a workstation in a second zone.

Browsing services are typically provided within existing configuration applications to browse the configuration database associated with the process control network for the location of particular pieces of configuration data. Browsing services are used to set up subscription to shared objects and to configure inter-zone references. Browser or sniffing applications may be provided at each configuration database to enable, for example, the local zone 12 database 30 to browse the remote zone 14 database 54 or other databases to find the location of any particular piece of configuration data within the distributed configuration system of the process control system 10. In particular, browse information is queried from a remote server upon user request and is cached locally. Browse roots may be detected by sniffing the network or may be detected using any other desired or known browsing technique. The knowledge of detected or configured browse roots may be persistent and, thus, will remain cached through a power cycle. The existence of these configuration object roots enables a user to browse down to other information associated with the roots to find the location of or the path to this information within the distributed configuration hierarchy of the process control system 10.

Inter-zone parameter browsing may be performed between zones that are already configured for inter-zone communications. The existing parameter browsing services may be extended to allow a user to select another zone by the zone name. The remote zone names may be cached at the location of the browsing service, of may be obtainable from the inter-zone server for the zone. Once the remote zone or zones have been selected, users browsing for parameters within the remote zone follow the same technique as for browsing the local zone. However, the resulting path created by the browsing sequence is directed to the configuration database of the remote zone, and browsing messages are directed through the inter-zone servers to the remote zone.

Other applications incorporated in process control networks will have utility across inter-connected zones in a process control system. For example, condition monitoring applications, such as loop monitoring, device monitoring and equipment monitoring applications, that automatically collect and store data pertaining to different function blocks of devices and loops within the process control network. One example of a condition monitoring application is described in U.S. Pat. No. 6,298,454, entitled "Diagnostics in a Process Control System" which was issued on Oct. 2, 2001, which is assigned to the assignee of the present invention and which is hereby expressly incorporated by reference herein. The diagnostics tool processes the data to determine which function blocks, devices, or loops have problems that may result in the reduced performance of the process control system, and then may suggest the use of other, more specific diagnostic tools to further analyze and correct the problem.

In process control systems having inter-connected zones, process control loops may be implemented for devices that are located in separate zones. Moreover, operators in one zone may have control or responsibility over a loop, devices or equipment locate in a remote zone. In these situations, the condition monitoring applications such as the diagnostics tool may be required to acquire data from remote zones. In these instances, the condition monitoring applications may be configured to set up monitoring and diagnostics routines with information relating to the zones in which the monitored parameters are located. Set up in this way, the monitoring and diagnostics routines can obtain information from the remote zones by formatting request messages with the location information for the remote zones so that the messages are routed by the inter-zone servers to the appropriate zones.

It will be understood that the objects and other elements and steps described herein to be created in or performed by the server and the clients may be implemented using any desired programming technique or language and that these programs may be stored in memories and executed on processors in any manner within the clients, the servers and the databases described herein. Moreover, although the data access technique described herein is preferably implemented in software, it may be implemented in hardware, firmware, etc., and may be implemented by any processor associated with the process control system 10. Thus, this technique may be implemented in a standard multi-purpose CPU or on specifically designed hardware or firmware as desired. When implemented in software, the software routines may be stored in any computer readable memory such as on a magnetic disk, a laser disk, an optical disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of transferring data in a process control system having a first process control network having a first inter-zone server and a second process control network having a second inter-zone server, wherein the first process control network operates under a first version of software and the second process control network operates under a second version of the software, the method comprising the steps of:

formatting a process control message in the first process control network, wherein the process control message contains a device name for a receiving device to which the process control message is being transmitted, and wherein the device name is defined for the receiving device within the process control system;

communicating the process control messages within the first process control network to the first inter-zone server;

determining at the first inter-zone server the process control network in which the receiving device is located based on the device name in the process control message;

converting process control messages from a format compatible with the first version of the software to a format compatible with the second version of the software and communicating the process control messages from the first inter-zone server to the second inter-zone server ia a first communication link in response to determining that the receiving device is located in the second process control network; and communicating the process control messages from the second inter-zone server to the second process control network.

2. The method of claim 1, wherein the process control system has a third process control network having a third inter-zone server, the method further comprising the steps of:

formatting process control messages in the third process control network, wherein the process control message contains a device name for a receiving device to which the process control message is being transmitted;

communicating the process control messages within the third process control network to the third inter-zone server;

determining at the third inter-zone server the process control network in which the receiving device is located based on the device name in the process control message;

communicating the process control message from the third inter-zone server to the first process control network via a second communication link in response to determining that the receiving device is located in the second process control network;

communicating the process control messages from the first process control network to the second inter-zone server via the first communication link in response to determining that the receiving device is located in the second process control network; and communicating the process control messages from the second inter-zone server to the second process control network.

3. The method of claim 1, wherein the first process control network has a first unique name and the second process control network has a second unique name defined for the process control networks within the process control system, wherein the formatting step comprises the step of formatting process control messages with the second unique name, the method further comprising the step of determining at the first inter-zone server to communicate process control messages to the second inter-zone server based on the second unique name in the process control messages.

4. The method of claim 1, wherein the formatting step comprises the step of formatting process control messages with the authorization information, the method further comprising the steps of:

determining at the first inter-zone server whether the process control messages received at the first inter-zone server are authorized for transfer to the second process control network; and communicating the process control messages from the first inter-zone server to the second inter-zone server based on the determination that the process control messages are authorized for transfer to the second process control network.

5. The method of claim 1, wherein the formatting step comprises the step of formatting process control messages with the authorization information, the method further comprising the steps of:
   determining at the second inter-zone server whether the process control messages received at the second inter-zone server are authorized for receipt by the second process control network; and
   communicating the process control messages from the second inter-zone server to the second process control network based on the determination that the process control messages are authorized for receipt by the second process control network.

6. The process control system of claim 5, wherein the authorization information of the process control messages is user information, the determination step comprising the step of evaluating the user information to determine whether the process control messages received at the second inter-zone server are authorized for receipt by the second process control network.

7. The method of claim 1, wherein the first process control network operates under a first alarm priority configuration and the second process control network operates under a second alarm priority configuration, the method further comprising the step of converting alarm information in process control messages from a format compatible with the first alarm priority configuration to a format compatible with the second alarm priority configuration.

8. The method of claim 1, wherein the first process control network is configured to use process control messages in a first verbal language and the second process control network is configured to use process control messages in a second verbal language, the method further comprising the step of translating process control messages in the first verbal language to process control messages in the second verbal language.

9. The method of claim 1, wherein the process control messages are condition monitoring messages.

10. A process control system comprising:
   a first process control network having a first inter-zone server and a plurality of field devices operatively connected to the first inter-zone server, wherein the field devices perform process control functions and transmit process control messages in the first process control network;
   a second process control network having a second inter-zone server and a plurality of field devices operatively connected to the second inter-zone server, wherein the field devices perform process control functions and transmit process control messages in the second process control network;
   a first communication link that communicatively couples the first inter-zone server and the second inter-zone server; and
   a communication routine stored in each of the first and the second inter-zone servers that uses the first communication link to transfer process control messages from the first process control network to the second process control network, and from the second process control network to the first process control network,
   wherein the process control messages contain a device name for a receiving device to which the process control message is being transmitted, wherein the device name is defined for the receiving device within the process control system, and the communication routine of the inter-zone server for the process control network of the field device transmitting the process control message uses the device name in the process control message to determine the process control network for the receiving device and transfers the process control message over the first communication link to the other process control network in response to determining that the receiving device is located in the other process control network, and
   wherein the first process control network operates under a first version of process control network software and the second process control network operates under a second version of the process control network software, the system further comprising a version control routine that converts process control messages from a format compatible with the first version of the process control network software to a format compatible with the second version of the process control network software when the process control messages are transferred from the first process control network to the second process control network.

11. The process control system of claim 10, further comprising:
   a third process control network having a third inter-zone server having a communication routine and a plurality of field devices operatively connected to the third inter-zone server, wherein the field devices perform process control functions and transmit process control messages in the third process control network; and
   a second communication link that communicatively couples the third inter-zone server to the first inter-zone server;
   wherein process control messages transmitted from field devices in the third process control network to receiving devices in the second process control network as determined by the communication routine of the third inter-zone server based on the device name in the process control messages are transferred from the third process control network to the first process control network using the second communication link and from the first process control network to the second process control network using the first communication link.

12. The process control system of claim 10, wherein the first process control network is configured to use process control messages in a first verbal language and the second process control network is configured to use process control messages in a second verbal language, one of the first and the second inter-zone servers having a language translation routine that converts process control messages in the first verbal language to process control messages in the second verbal language when process control messages are transferred from the first process control network to the second process control network.

13. The process control system of claim 10, the first process control network having a first device with a first device name and being communicatively connected to the first inter-zone server, the second process control network having a second device with a second device name and being communicatively connected to the second inter-zone server, the second device communicating process control messages containing the first device name to the second inter-zone server, the system further comprising a name routine stored in the second inter-zone server that uses the first device name in the process control messages of the second device to cause the communication routine to use the first communication link to transfer the process control messages containing the first device name from the second process control network to the first process control network.

14. The process control system of claim 10, wherein the process control messages contain authorization information, and the system further comprises a security routine stored in each of the first and the second inter-zone servers that determines whether the process control messages are authorized for transfer between the first and second process control networks, and that causes the communication routine to transfer process control messages that are determined to be authorized for transfer between the first and second process control networks.

15. The process control system of claim 14, wherein the authorization information of the process control messages is user information, and the security routine determines whether the process control messages are authorized for transfer between first and second process control networks by comparing the user information to a list of users authorized to transfer information between the first and second process control networks.

16. The process control system of claim 14, wherein the security routine determines whether the process control messages are authorized for transfer between the first and second process control networks after the process control messages are transferred from one of the first and second inter-zone servers to the other of the first and second inter-zone servers.

17. The process control system of claim 10, wherein the first process control network operates under a first alarm priority configuration and the second process control network operates under a second alarm priority configuration, one of the first and the second inter-zone servers having an alarm routine that converts alarm information in process control messages from a format compatible with the first alarm priority configuration to a format compatible with the second alarm priority configuration when the process control messages containing alarm information are transferred from the first process control network to the second process control network.

18. The process control system of claim 10, wherein the process control messages are condition monitoring messages.

19. The process control system of claim 10, wherein the first communication link is a shared local area network link.

20. The process control system of claim 10, wherein the first communication link is a satellite communication link.

21. The process control system of claim 10, wherein the first communication link is a cellular communication link.

22. The process control system of claim 10, wherein the first communication link is a telephone line communication link.

23. The process control system of claim 10, wherein the first communication link is a portable memory communication link.

24. The process control system of claim 10, wherein the first communication link is a wireless communication link.

25. The process control system of claim 10, wherein the first communication link is a wide area network link.

26. A local process control network in a process control system having a plurality of process control networks communicatively interconnected by communication links, the process control networks being able to transfer process control messages to each other via the communication links, the local process control network comprising:

a controller;

at least one device capable of performing process control functions;

a bus communicatively connecting the controller and the at least one device whereby the controller and the at least one device transmit process control messages on the bus; and an inter-zone server connected to the bus and having a communication routine that uses at least one of the communication links to transfer process control messages between the controller and at least one device of the process control network, and a remote process control network of the process control system, wherein the process control messages contain a device name for a receiving device to which the process control message is being transmitted, wherein the device name is defined for the receiving device within the process control system, and the communication routine of the inter-zone server uses the device name in the process control message to determine the process control network for the receiving device and transfers the process control message over one of the communication links to the remote process control network in response to determining that the receiving device is located in the remote process control network, and wherein the controller and the at least one device operate under a first version of software and one of the remote process control networks operates under a second version of the software, the inter-zone server having a version control routine that converts process control messages from a format compatible with the first version of the software to a format compatible with the second version of the software when the process control messages are transferred to the one of the remote networks operating under the second version of the software.

27. The local process control network of claim 26, wherein each remote process control network of the process control system has a unique name defined for the remote process control network within the process control system, and the controller and at least one device transmit process control messages containing the unique names of the remote process control networks, the inter-zone server having a name routine that uses the unique names in the process control messages to cause the communication routine to use at least one of the communication links to transfer the process control messages containing the unique names to the corresponding remote process control networks.

28. The local process control network of claim 26, wherein the process control messages contain authorization information, and the inter-zone server having a security routine that determines whether the process control messages are authorized for transfer to the remote process control networks, and that causes the communication routine to transfer process control messages that are determined to be authorized for transfer to remote process control networks.

29. The local process control network of claim 28, wherein the authorization information of the process control messages is user information, and the security routine determines whether the process control messages are authorized for transfer to the remote process control networks by comparing the user information to a list of users authorized to transfer information to remote process control networks.

30. The local process control network of claim 26, wherein the remote process control networks transmit process control messages containing authorization information to the at least one device via the communication links, the inter-zone server having a security routine that determines whether the process control messages are authorized for receipt from the remote process control networks, and that causes the communication routine to transfer process control messages that are determined to be authorized for receipt to the at least one device via the bus.

31. The local process control network of claim 30, wherein the authorization information of the process control messages is user information, and the security routine determines whether the process control messages are authorized for receipt from the remote process control networks by comparing the user information to a list of users from whom process control messages from remote process control networks are authorized to be received.

32. The local process control network of claim 26, wherein one of the remote process control networks transmits process control messages in a format compatible with the second version of the software to the at least one device via the communication links, and the version control routine converts process control messages from the format compatible with the second version of the software to a format compatible with the first version of the software when the process control messages are received from the one of the remote networks operating under the second version of the software.

33. The local process control network of claim 26, wherein the controller and at least one device operate under a first alarm priority configuration and one of the remote process control networks operates under a second alarm priority configuration, the inter-zone server having an alarm routine that converts alarm information in process control messages from a format compatible with the first alarm priority configuration to a format compatible with the second alarm priority configuration when the process control messages containing alarm information are transferred from the local process control network to one of the remote process control networks.

34. The local process control network of claim 26, wherein the controller and at least one device are configured to use process control messages in a first verbal language and one of the remote process control networks is configured to use process control messages in a second verbal language, the inter-zone server having a language translation routine that converts process control messages in the first verbal language to process control messages in the second verbal language when process control messages are transferred to the one of the remote process control networks.

35. The local process control network of claim 26, wherein the controller and at least one device are configured to use process control messages in a first verbal language, and one of the remote process control networks is configured to use process control messages in a second verbal language and to transfer process control messages in the second verbal language to the local process control network via one of the communication links, the inter-zone server having a language translation routine that converts process control messages in the second verbal language to process control messages in the first verbal language when process control messages are received from the one of the remote process control networks.

36. The local process control network of claim 26, wherein the process control messages are condition monitoring messages.

37. An inter-zone server in a local process control network having a controller communicatively coupled by a bus with at least one device capable of performing process control functions, the process control network being part of a process control system having a plurality of remote process control networks communicatively interconnected by communication links, the remote process control networks being able to transfer process control messages to each other and the local process control network via the communication links, the inter-zone server comprising:
  a first communication link that communicatively couples the inter-zone server to the local process control network for transferring and receiving process control messages;
  a second communication link that communicatively couples the inter-zone server to one of the remote process control networks for transferring and receiving process control messages; and
  a communication routine that uses the first and second communication links to transfer process control messages between the local process control network and the one of the remote process control networks,
  wherein the process control messages contain a device named for a receiving device to which the process control message is being transmitted, wherein the device name is defined for the receiving device within the process control system, and the communication routine of the inter-zone server uses the device name in the process control message to determine the process control network for the receiving device and transfers the process control message over the second communication link to the remote process control network in response to determining that the receiving device is located in the remote process control network, and
  wherein the controller and the at least one device operate under a first version of software and the one of the remote process control networks operates under a second version of the software, the inter-zone server further comprising a version control routine that converts process control messages from a format compatible with the first version of the software to a format compatible with the second version of the software when the process control messages are transferred to the one of the remote process control networks.

38. The inter-zone server of claim 37, wherein the one remote process control network has a unique name defined for the remote process control network within the process control system, and the controller and at least one device transmit process control messages containing the unique name of the one of the remote process control networks, the inter-zone server further comprising a name routine that uses the unique name in the process control messages to cause the communication routine to use the second communication link to transfer the process control messages containing the unique name to the one of the remote process control networks.

39. The inter-zone server of claim 37, wherein the process control messages contain authorization information, the inter-zone server further comprising a security routine that determines whether the process control messages are authorized between the controller and at least one device, and the one of the remote process control networks, and that causes the communication routine to transfer process control messages that are determined to be authorized for transfer.

40. The inter-zone server of claim 39, wherein the authorization information of the process control messages is user information, and the security routine determines whether the process control messages are authorized for transfer by comparing the user information to a list of users authorized to transfer process control messages between the controller and at least one device, and the one of the remote process control networks.

41. The inter-zone server of claim 37, wherein the one of the remote process control networks transmits process control messages in a format compatible with the second version of the software to the at least one device via the second communication link, and the version control routine converts process control messages from the format compatible with the second version of the software to a format compatible with the first version of the software when the process control messages are received from the one of the remote process control networks.

42. The inter-zone server of claim 37, wherein the controller and at least one device operate under a first alarm priority configuration and the one of the remote process control networks operates under a second alarm priority configuration, the inter-zone server further comprising an alarm routine that converts alarm information in process control messages from a format compatible with the first alarm priority configuration to a format compatible with the second alarm priority configuration when the process control messages containing alarm information are transferred from the local process control network to the one of the remote process control networks.

43. The inter-zone server of claim 37, wherein the controller and at least one device are configured to use process control messages in a first verbal language and the one of the remote process control networks is configured to use process control messages in a second verbal language, the inter-zone server further comprising a language translation routine that converts process control messages in the first verbal language to process control messages in the second verbal language when process control messages are transferred to the one of the remote process control networks.

44. The inter-zone server of claim 37, wherein the controller and at least one device are configured to use process control messages in a first verbal language, and the one of the remote process control networks is configured to use process control messages in a second verbal language, the inter-zone server further comprising a language translation routine that converts process control messages in the second verbal language to process control messages in the first verbal language when process control messages are received from the one of the remote process control networks.

45. The inter-zone server of claim 37, further comprising a third communications link that communicatively couples the inter-zone server to a second one of the remote process control networks for transferring and receiving process control messages, and wherein the communication routine uses the first and third communications links to transfer process control messages between the local process control network and the second one of the remote process control networks, and wherein the second and third communications links are used to transfer process control messages between the one of the remote process control networks and the second one of the remote process control networks.

46. The inter-zone server of claim 37, wherein the process control messages are condition monitoring messages.

* * * * *